(12) United States Patent
Saracino et al.

(10) Patent No.: US 11,002,847 B2
(45) Date of Patent: May 11, 2021

(54) INCORRECT TIME OR WRONG KEY INDICATOR

(71) Applicant: BAE Systems Information and Electronic Systems Integration Inc., Nashua, NH (US)

(72) Inventors: Robert F. Saracino, Lindenhurst, NY (US); Robert C. Bonino, Northport, NY (US); Andrew E. Klappert, King Park, NY (US); David C. Ringlen, Coram, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 331 days.

(21) Appl. No.: 16/287,374

(22) Filed: Feb. 27, 2019

(65) Prior Publication Data
US 2020/0271773 A1    Aug. 27, 2020

(51) Int. Cl.
*G01S 13/76*    (2006.01)
*G01S 13/78*    (2006.01)
*H04L 9/32*    (2006.01)

(52) U.S. Cl.
CPC .......... *G01S 13/765* (2013.01); *G01S 13/767* (2013.01); *G01S 13/78* (2013.01); *H04L 9/3271* (2013.01)

(58) Field of Classification Search
CPC ...... G01S 13/765; G01S 13/767; G01S 13/78; H04L 9/3271
See application file for complete search history.

(56) References Cited

U.S. PATENT DOCUMENTS

| | | | | |
|---|---|---|---|---|
| 5,745,575 A * | 4/1998 | Otto | ........................ | G01S 13/78 380/270 |
| 5,822,430 A * | 10/1998 | Doud | ..................... | H04K 3/255 380/260 |
| 8,102,302 B2 * | 1/2012 | Alon | ....................... | G01S 13/78 342/36 |
| 2008/0250243 A1 * | 10/2008 | Bretheim | .............. | H04L 9/3271 713/168 |
| 2018/0299541 A1 * | 10/2018 | Aharoni | .................. | G01S 17/06 |

OTHER PUBLICATIONS

Baker, Amy, "1030/1090 MHz RF Monitor System," AIMS & NSA User Working Group, The MITRE Corporation, May 17, 2018. 28 pages.
Saracino, et al., "Protecting MarkXIIA Time and Position," BAE Systems, Presented on May 17, 2018 to AIMS and NSA User Working Group. 13 pages.

* cited by examiner

*Primary Examiner* — Timothy X Pham
(74) *Attorney, Agent, or Firm* — Finch & Maloney PLLC

(57) ABSTRACT

An identification friend or foe (IFF) transponder includes: an electronic receiver to receive encoded challenges from an IFF interrogator; a processing circuit including a decode circuit to decode the received challenges into encrypted challenges using a time of day (TOD) and/or a cryptographic key, a decrypt circuit to decrypt the encrypted challenges into challenges using the TOD and/or the key, a reply circuit to generate replies to the challenges, and an encode circuit to encode the generated replies using the TOD and/or the key; an electronic transmitter to transmit the encoded replies to the IFF interrogator; and an alert circuit to detect the encrypted challenges from the received challenges without using the TOD or the key, use the detected challenges to determine if the TOD is incorrect and/or the key is wrong, and issue an alert in response to determining the TOD is incorrect and/or the key is wrong.

20 Claims, 7 Drawing Sheets

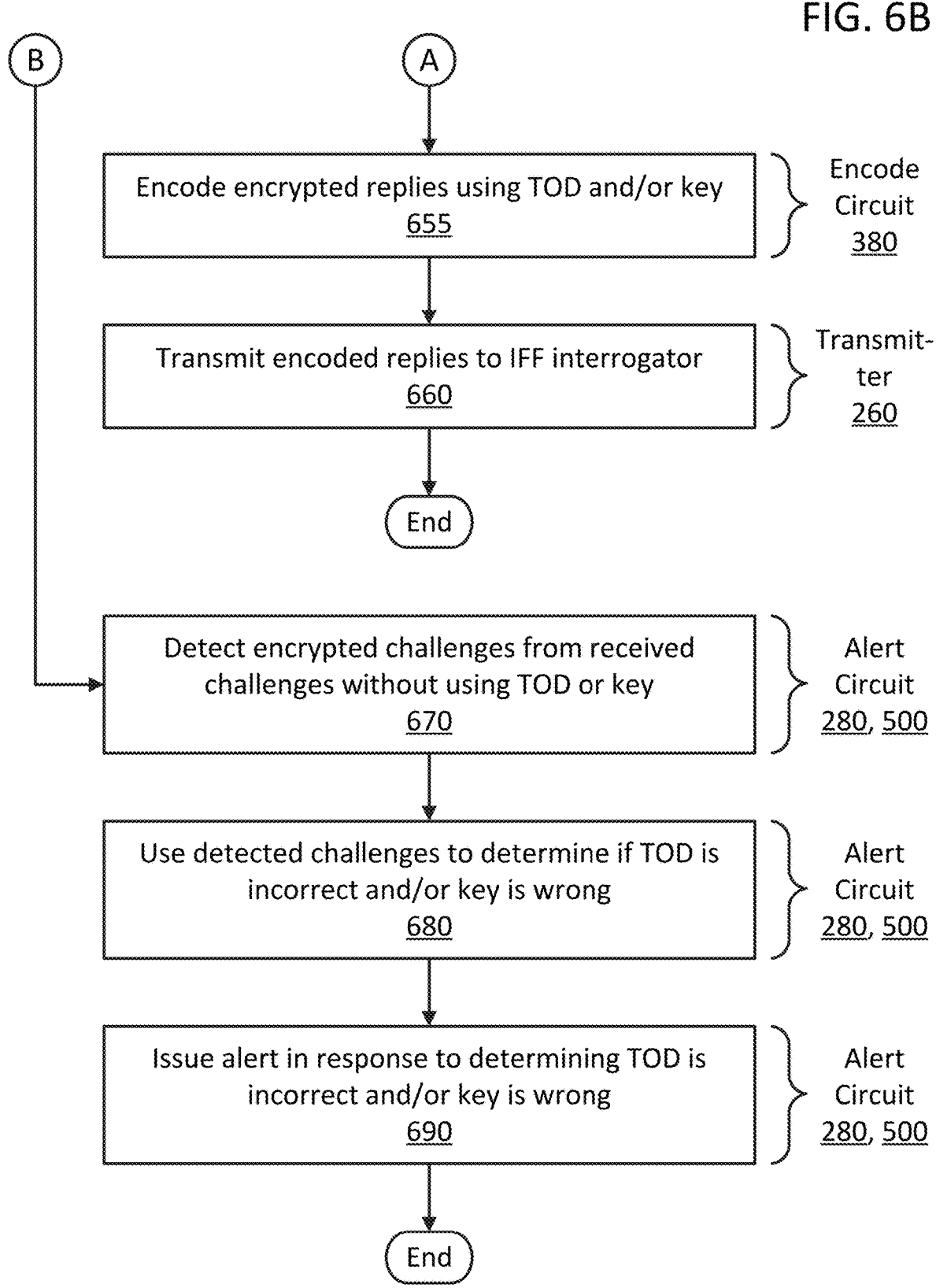

INCORRECT TIME OR WRONG KEY INDICATOR

BACKGROUND

Distinguishing hostile combatants from friendly forces in military engagements has been a long-standing challenge. Reducing friendly fire casualties (fratricide) is a goal for any military force. Modern vessels or craft (such as aircraft including helicopters) use automated tools such as identification friend or foe (IFF) systems to reduce the likelihood or extent of misidentification and fratricide. In an IFF system, an interrogator interested in knowing if a potential target (such as an air, land, or sea craft, or just platform) is friendly, transmits an encrypted signal (or challenge) to the platform. In response, a transponder on the platform receives, decrypts, and responds with a corresponding signal that lets the interrogator know that the platform is friendly. However, there are a number of non-trivial issues associated with IFF systems.

BRIEF DESCRIPTION OF THE DRAWINGS

FIGS. 6A-6B are a flow diagram of an example method of IFF transponder processing, such as by the IFF transponder of FIG. 2, according to an embodiment of the present disclosure.

Figure 1:
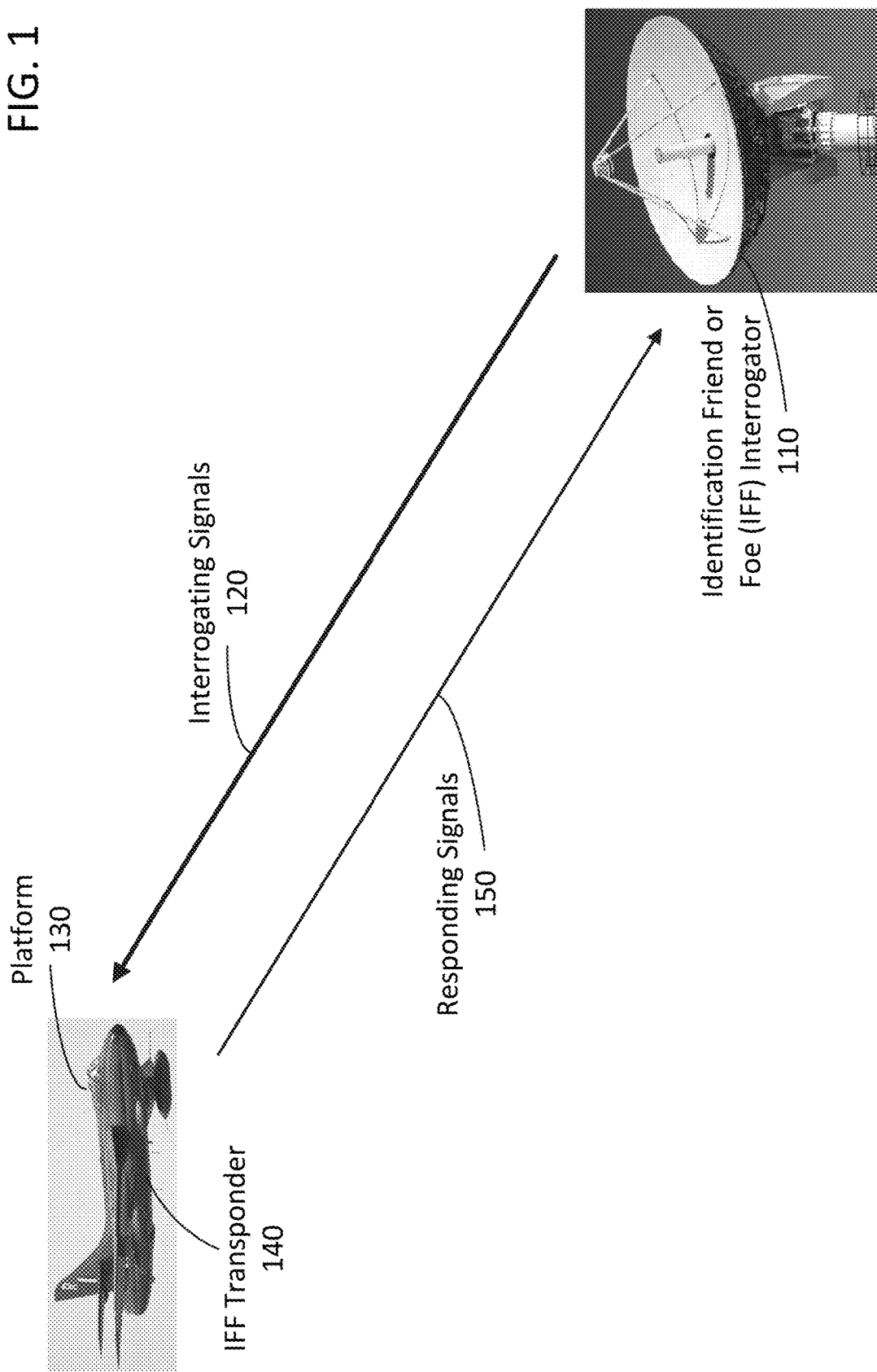
FIG. 1 is a schematic diagram of an example use case in which an identification friend or foe (IFF) transponder is employed, according to an embodiment of the present disclosure.

Although the following Detailed Description will proceed with reference being made to illustrative embodiments, many alternatives, modifications, and variations thereof will be apparent to those in light of the present disclosure.

DETAILED DESCRIPTION

In an embodiment of the present disclosure, an identification friend or foe (IFF) transponder provides indication of a potentially unsafe situation to an operator of a vessel or craft housing the IFF transponder. For example, the IFF transponder can alert the operator if the time of day (TOD) and/or cryptographic key being used by the transponder is or are incorrect. To this end, and according to one such embodiment, the IFF transponder includes an electronic receiver, a processing circuit, an electronic transmitter, and an alert circuit. The receiver receives electromagnetic radiation including pulse patterns of encoded signals. The encoded signals include encrypted challenges from an IFF interrogator. The processing circuit includes a decode circuit, a decrypt circuit, a reply circuit, an encrypt circuit, and an encode circuit. The decode circuit decodes the received signals into the encrypted challenges using the TOD and/or the cryptographic key. In addition, the decrypt circuit decrypts the decoded challenges using the TOD and/or the cryptographic key. The reply circuit prepares corresponding replies to the decrypted challenges. The encrypt circuit encrypts the replies using the TOD and/or the key. The encode circuit encodes the encrypted replies using the TOD and/or the key. The transmitter transmits the encoded replies to the IFF interrogator. Concurrent with this IFF transponder processing by the IFF transponder, the alert circuit analyzes the received signals to detect the encrypted challenges without using the TOD or the cryptographic key. The alert circuit uses the detected challenges and the lack of proper decryption (authentication) to determine if the TOD is incorrect and/or the cryptographic key is wrong. In response to determining the TOD is incorrect and/or the cryptographic key is wrong, the alert circuit alerts an operator of the IFF transponder that the TOD is incorrect and/or the cryptographic key is wrong. In some such embodiments, the IFF transponder is a Mode 5 transponder and the encrypted challenges are Mode 5 challenges. In any such cases, the alert circuit alerts the operator by, for example, directing or otherwise causing n visual alert to display on one of the multi-function displays available to the operator. In some such embodiments, the alert circuit analyzes the received signals by monitoring pulse patterns of the received signals to detect the encrypted challenges without using the TOD or the cryptographic key. The alert circuit also monitors the encrypted challenges decoded by the decode circuit from the received signals, and monitors the replies to the decrypted challenges that are prepared by the reply circuit. The alert circuit then uses the monitored pulse patterns, the monitored challenges, and the monitored replies together with a threshold detector, to determine if the TOD is incorrect and/or the cryptographic key is wrong. For example, if the alert circuit detects interrogator waveforms, but the decode circuit cannot decode or the decrypt circuit cannot decrypt (authenticate) them, the alert circuit alerts the operator of the possibly incorrect TOD and/or cryptographic key. In addition, if the alert circuit detects interrogator waveforms, but the reply circuit does not respond to them, the alert circuit alerts the operator of the possibly incorrect TOD and/or cryptographic key. In some embodiments, the alert circuit activates an audio alert to the operator. In other embodiments, the alert circuit activates a visual alert to the operator. In still other embodiments, the alert circuit activates a tactile alert to the operator. In some embodiments, the operator decides what type of alert to receive from the alert circuit (user-configurable). Numerous variations and embodiments will be appreciated in light of this disclosure.

General Overview

As mentioned above, there are a number of non-trivial issues associated with IFF systems. For example, a target or targeted platform of an IFF interrogator may not have correct information, such as the proper time, encryption key, or the like, for its transponder to respond correctly to the interrogation challenge (e.g., the transponder may be unable to decode, decrypt, or respond to the challenge, and may even be unaware of the challenge). As an IFF transponder is intended to be automated for all or most of its operation, the operator (such as a pilot) of the targeted platform or of the platform's transponder may be unaware of the incorrect information. This can be a dangerous situation to the pilot, as it can lead to incorrect or missing replies to the interrogation, leaving the interrogator to believe the targeted craft is possibly a hostile target, which can result in unintended engagement or fratricide. For example, in the newer Mode 5 IFF design that is replacing Mode 4, decoding of the waveform is dependent on the interrogator and the transponder having a matching time of day (TOD), within a small window. However, having the correct time of day (TOD) can sometimes be compromised by events such as a bad time load, excessive drift, or a bad time update. In such circumstances, the pilot of an aircraft might be unaware that friendly interrogators were trying to identify the aircraft and that the aircraft was not (or not properly) responding, which can lead to unintentional engagement and destruction of the aircraft.

Accordingly, in an embodiment of the present disclosure, an alert circuit for an IFF transponder is provided. The alert circuit helps detect interrogator waveforms without the help or use of the correct TOD or cryptographic key. In one example embodiment, the IFF transponder is a Mode 5 transponder, and the alert circuit utilizes characteristics of the Mode 5 interrogator waveform (challenge) to determine if the alert needs to be created. The characteristics can include, for example, the preamble pulse pattern, such as the number and possible locations of preamble pulses, which have a stagger pattern that varies with the TOD and cryptographic key. For instance, in one embodiment, the alert circuit sends an alert to the pilot or other operator when the transponder is receiving interrogator waveforms, but the transponder hardware is not decoding, decrypting, and/or responding to such waveforms. In an embodiment, the alert circuit uses a threshold detector together with corresponding threshold ratios (e.g., valid interrogator waveforms to total interrogator waveforms) to determine if the IFF transponder is potentially trying to operate with an incorrect TOD or cryptographic key.

For example, in some embodiments, the alert circuit, such as a field programmable gate array (FPGA) or microprocessor, includes logic (e.g., gate level logic, purpose-built semiconductor or an application specific integrated circuit or so-called ASIC, or a processor or other configurable circuit programmed with firmware or software, or other physical functional circuitry) to analyze received signals from an electronic receiver of the IFF transponder. Here, the receiver receives electromagnetic radiation including encoded signals, which include encrypted challenges from an IFF interrogator. The encoded signals are decodable by a decode circuit of the IFF transponder into the encrypted challenges using the TOD and/or the cryptographic key. The encrypted challenges are then decryptable by a decrypt circuit using the TOD and/or the cryptographic key.

Further, the logic to analyze the received signals includes logic to detect the encrypted challenges without using the TOD or the cryptographic key, and logic to determine, from the detected challenges, if the TOD is incorrect and/or the cryptographic key is wrong. The alert circuit further includes logic to, in response to determining the TOD is incorrect and/or the cryptographic key is wrong, alert an operator of the IFF transponder that the TOD is incorrect and/or the cryptographic key is wrong. In an embodiment, the IFF transponder is a Mode 5 transponder and the encrypted challenges are Mode 5 challenges. In such an embodiment, the alert circuit includes logic to detect the preamble pulses of the interrogation challenges without knowledge of the variable stagger pattern. From this detection, the alert circuit includes logic to decide if the detected preamble pulse pattern is that of a possible Mode 5 challenge. In an embodiment, the logic to alert the operator includes logic to direct or otherwise cause an electronic speaker to emit an audio signal that is audible to the operator.

In some embodiments, the logic to detect the encrypted challenges includes logic to monitor pulse patterns of the received signals to detect the encrypted challenges without using the TOD or the cryptographic key. In addition, the logic to analyze the received signals further includes logic to monitor the encrypted challenges decoded by the decode circuit from the received signals, and logic to monitor corresponding replies to the decrypted challenges prepared by a reply circuit of the IFF transponder. Moreover, the logic to determine if the TOD is incorrect and/or the cryptographic key is wrong includes logic to use the monitored pulse patterns, the monitored challenges, and the monitored replies together with a threshold detector, to determine if the TOD is incorrect and/or the cryptographic key is wrong.

In some such embodiments, the logic to monitor the pulse patterns of the received signals includes: logic to identify preamble portions of the pulse patterns of the encrypted challenges without using the TOD or the cryptographic key; logic to identify corresponding data portions following the identified preamble portions of the pulse patterns of the encrypted challenges, without using the TOD or the cryptographic key; and logic to detect the encrypted challenges as those pulse patterns having the identified preamble and data portions. In one such embodiment, the logic to use the monitored pulse patterns, the monitored challenges, and the monitored replies with the threshold detector includes: logic to determine a number of the detected challenges; logic to determine a number of the encrypted challenges decoded from the received signals by the decode circuit; logic to determine a number of the prepared replies; logic to create one or more ratios of corresponding pairs of the number of detected challenges, the number of encrypted challenges decoded from the received signals by the decode circuit, and the number of prepared replies; and logic to compare the one or more ratios to corresponding alert levels of the threshold detector, to determine if the TOD is incorrect and/or the cryptographic key is wrong.

In some embodiments, the alert circuit is part of an IFF transponder that also includes the electronic receiver, the decode circuit, the decrypt circuit, a reply circuit to prepare corresponding replies to the decrypted challenges, and an electronic transmitter to transmit the prepared replies to the IFF interrogator. In some embodiments, the alert circuit is an FPGA. In addition, an FPGA design product including one or more non-transitory machine-readable storage mediums having FPGA design components encoded thereon is provided. When the FPGA is reconfigured by the design product, the FPGA performs the tasks of the alert circuit of one or more of the above techniques for IFF transponder processing. Numerous other example embodiments and configurations will be apparent in light of this disclosure.

System Architecture

FIG. 1 is a schematic diagram of an example use case in which an identification friend or foe (IFF) transponder 140 is employed, according to an embodiment of the present disclosure. There is an IFF interrogator 110 that wants to determine if a platform 130 is a friendly or potentially hostile aircraft. The IFF interrogator 110 sends an encoded set of interrogating signals 120 (requests or challenges) to the platform 130, which is equipped with the corresponding IFF transponder 140 (such as those described in the present disclosure). The IFF transponder 140 receives the interrogating signals 120 and responds with an encoded set of responding signals 150 (replies). Correct or appropriate such replies 150 can satisfy the IFF interrogator to believe that the platform 130 is friendly. The depiction of the interrogator 110 as a ground base and the platform as an aircraft is merely for explaining the operations in one example. The interrogator can be ground based, maritime based, air based, or space based. Likewise, the platform can be ground based, maritime based, air based, or space based.

In further detail, the interrogating signals 120 can contain numerous electronic challenges, for which the IFF transponder 140 has to respond appropriately via the responding signals 150. If the IFF transponder 140 responds appropriately, the IFF interrogator 110 can determine that the platform 130 is a friendly aircraft (along with other possible identifying information, such as the type of aircraft, nation of allegiance, serial or other identification number, location or position information, and the like). The interrogating signals 120 and responding signals 150 can be encoded and modulated in multiple ways, such as minimum-shift keying (MSK) modulation (such as in pulses each having numerous bits encoded using MSK modulation) and digital signal modulation (e.g., pulses including rising and falling edges having corresponding rise and fall times). In addition, the challenges and replies can be encrypted (e.g., through a cryptographic technique on the bits that undergo MSK modulation) using a cryptographic key prior to encoding and transmission to the platform 130 or back to the interrogator 110.

Figure 2:
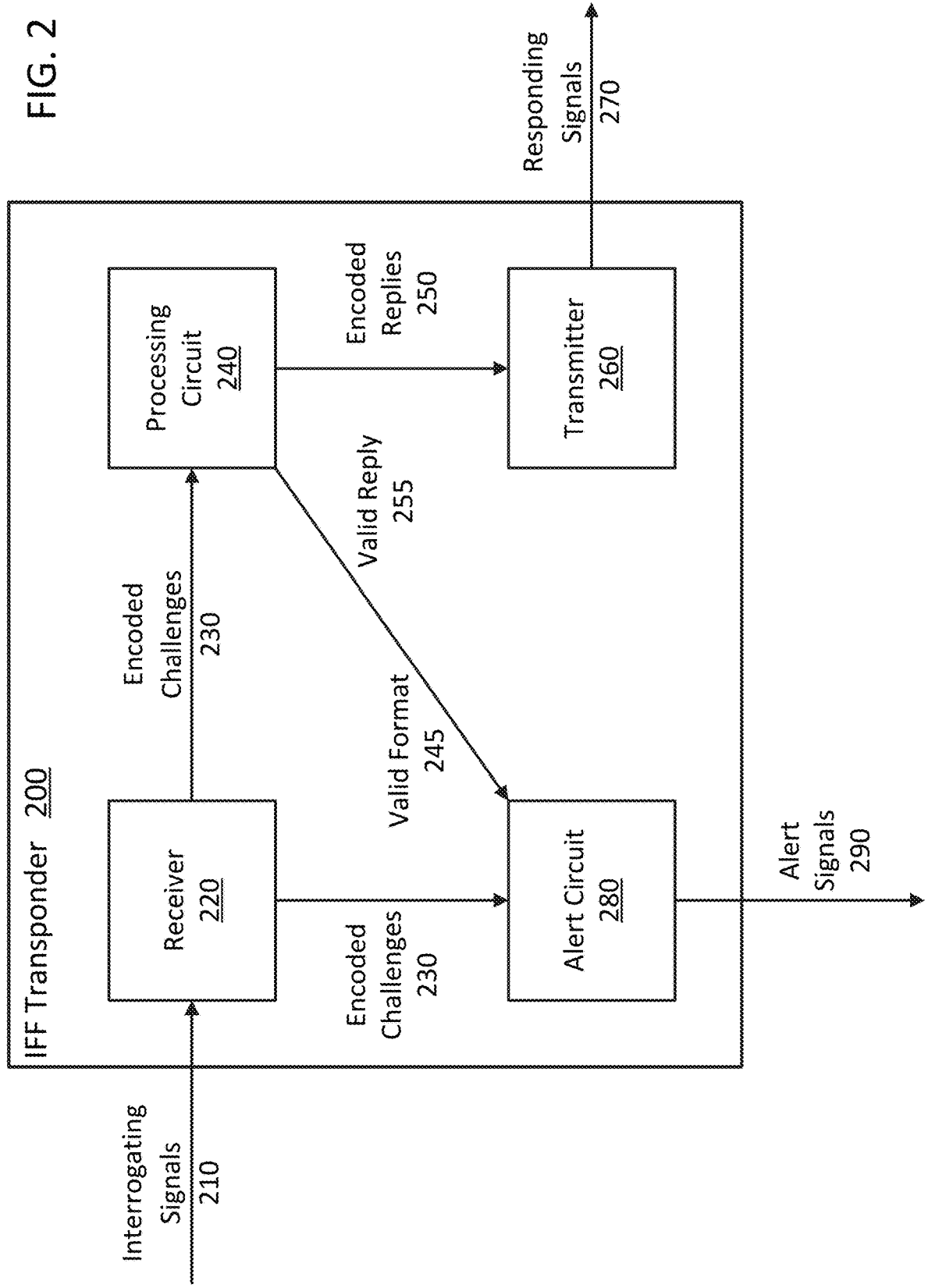
FIG. 2 is a block diagram of an example IFF transponder, such as the IFF transponder of FIG. 1, according to an embodiment of the present disclosure.

FIG. 2 is a block diagram of an example IFF transponder 200, such as the IFF transponder 140 of FIG. 1, according to an embodiment of the present disclosure. Components of the IFF transponder 200 and other electronic components, circuits, and techniques described herein can be implemented as (or on) an electronic processing component, such as a signal processor, a field programmable gate array (FPGA), a microprocessor, or the like. For example, parts of the IFF transponder 200 and other components or methods can be implemented in hardware or software, or some combination of the two. For instance, components of the IFF transponder 200 can be implemented as a microprocessor with instructions encoded therein that, when executed by the microprocessor, cause the microprocessor to carry out some of the tasks of the IFF transponder 200. In another embodiment, parts of the IFF transponder 200 may be implemented as a custom circuit such as a field programmable gate array (FPGA) or other custom logic configured to carry out these tasks. In a further example, there are one or more memory units (such as non-volatile memory units) that is or are coupled to the processing component.

For example, components of the IFF transponder 200 and other circuits disclosed herein may be custom hardware circuits or general-purpose computer hardware configured (e.g., through software, firmware, customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit. To this end the degree of integration or distribution may vary from one embodiment to the next. For example, while processing circuit 240 is shown as being separate from alert circuit 280, in other embodiments, processing circuit 240 may be part of or otherwise integrated with alert circuit 280.

As will be further appreciated, a circuit as used herein is a physical structure capable of carrying out one or more functionalities as variously provided herein, whether the structure be hardware only such as purpose-built semiconductor (e.g., gate-level logic or application specific integrated circuit) or a printed circuit board populated with discrete components configured and arranged to carry out the various functionalities provided herein, or a processor-based system programmed with computer code or instructions that are executable by the processor-based system to carry out the various functionalities provided herein, or a combination of such hardware and software based architectures (e.g., printed circuit board with one or more embedded routines executable by one or more processors). Numerous such embodiments and configurations will be appreciated in light of this disclosure.

Returning to FIG. 2, the IFF transponder 200 includes components such as a receiver 220, a processing circuit 240, a transmitter 260, and an alert circuit 280. The IFF transponder 200 may also include one or more power supplies for supplying electrical power to the different components. The IFF transponder 200 (and more specifically, the receiver 220) receives interrogating signals 210 (e.g., analog signals emitted from an IFF interrogator, such as the IFF interrogator 110 of FIG. 1) and replies with responding signals 270 (e.g., analog signals emitted by the transmitter 260). The interrogating signals 210 and responding signals 270 may be encrypted. In addition, the interrogating signals 210 and responding signals 270 may be encoded for modulation as electromagnetic radiation, such as modulated 1030 megahertz (MHz) waveforms for the interrogating signals 210 and modulated 1090 MHz waveforms for the responding signals 270.

In further detail, the receiver 220 receives the interrogating signals 210 as electromagnetic radiation and converts them to encoded signals or pulse patterns that include encoded challenges 230. These pulses patterns can be waveforms of encoded IFF challenges, whose corresponding data are encrypted in addition to being encoded. As used herein, encoding refers to modulating for transmission as electromagnetic radiation, while encryption refers to altering data in a reversible manner to make the data unintelligible to eavesdroppers lacking the cryptographic key and technique to decrypt the encrypted data.

In some embodiments, the pulse patterns or waveforms have a format that varies depending on variables such as a time of day (TOD) or a cryptographic key (e.g., to make the pattern or waveform harder to identify or demodulate without the TOD and/or key). Accordingly, the processing circuit 240 decodes (e.g., demodulates, digitizes, and the like) the encoded challenges 230 into the encrypted challenges that they represent, together with corresponding indicators of valid format 245, from one or more IFF interrogators and using the TOD and/or key for the decoding. The valid format 245 signal indicates that an interrogation waveform or challenge having a valid format with respect to the TOD and cryptographic key has been received and decoded by the processing circuit 240. In addition, the processing circuit 240 decrypts the encrypted challenges into decrypted challenges (or just challenges) using the TOD and/or key.

If the processing circuit 240 has the wrong TOD or key, results may be unpredictable. For instance, the processing circuit 240 may be unable to produce the encrypted challenges, or to set the valid format 245 indicator correctly, or to produce the decrypted challenges. In addition, the processing circuit 240 may produce digital data that is not comprehendible when operating with the wrong TOD or key.

The processing circuit 240 processes the (decrypted) challenges and, if the challenges are proper challenges (as opposed to, say, random bits) after the decryption, the processing circuit 240 prepares corresponding replies to the challenges. The processing circuit 240 can further encrypt the replies and encode the encrypted replies prior to outputting the encoded replies 250 to the challenges. In some embodiments, the processing circuit 240 issues a corresponding indicator of a valid reply 255. The encoded replies 250 may identify the target craft with different pieces of information, such as its identification number, class of vehicle or craft, country of allegiance, location, altitude, and the like. The valid reply 255 signal indicates that a decrypted challenge having meaningful content has been processed and replied to by the processing circuit 240. The encoded replies 250 may also be encrypted (e.g., using the same key as the decryption) prior to transmission to the interrogator. In one embodiment, the transmitter 260 receives the encoded replies 250, modulates them on a carrier wave (such as a 1090 MHz carrier wave), amplifies the modulated signal, and transmits the resulting responding signals 270 over an antenna back to the interrogator.

While all this IFF transponder processing is taking place (receiving interrogator challenges, decoding and decrypting the challenges, responding to the challenges, and transmitting the replies), the alert circuit 280 monitors the pulse patterns including the encoded challenges 230, the valid format 245 indicator from the processing circuit 240, and the valid reply 255 indicator from the processing circuit 240. The alert circuit 280 does not have the TOD or cryptographic key to decipher the pulse patterns or encoded challenges 230. Rather, the alert circuit 280 is aware of the general form of interrogating requests or challenges (e.g., preamble pulses, sidelobe suppression pulses, and data pulses), but not the specific timing of the pulses nor the decrypted content of the data pulses, which varies with the TOD and cryptographic key. Accordingly, the alert circuit 280 can make an accurate determination (or detection) of when an interrogation request is being received by the receiver 220 (e.g., an apparent interrogation request, or detected request or challenge), but cannot determine if the request has a valid format and valid content for the current TOD and cryptographic key.

The alert circuit 280 monitors the valid format 245 signal output from the processing circuit 240, which provides an indication whether a valid interrogation request has been received, or at least whether a request having the proper pulse pattern, spacing, and properly encoded data pulses (e.g., through MSK encoding or other encoding technique) has been received. In some embodiments, the processing circuit 240 indicates whether a valid interrogation waveform has been received using the valid format 245 signal, and generates the waveform's decrypted content as part of the decrypted challenges, using the TOD and key. While the decrypted data generated in the processing circuit 240 may not be comprehendible, the alert circuit 280 lines up any received (and presumably valid) interrogation waveform (from analyzing the encoded challenges 230) with the indication of the valid format 245 from the processing circuit 240 that a valid waveform was received. The alert circuit 280 can then determine, for example, what ratio, fraction, or percentage of the incoming challenge waveforms received by the IFF transponder 200 have a proper or valid format 245 with respect to the transponder's TOD and key.

In some embodiments, a small (such as less than a threshold value) ratio, fraction, or percentage of proper interrogation waveforms is interpreted by the alert circuit 280 as the IFF transponder 200 is operating with an incorrect TOD or key, and a corresponding alert is sent to the operator via the alert signals 290. In addition, the alert circuit 280 monitors the valid reply 255 signal output from the processing circuit 240, which provides an indication of how many of the decrypted challenges have valid content (e.g., are legitimate requests, under the assumption only legitimate requests generate valid replies from the processing circuit 240). From the number of indications of valid reply 255, the number of indications of valid format 245, and the number of valid interrogation waveforms detected in the encoded challenges 230, the alert circuit 280 can determine the number of valid interrogation requests being received and decrypted, and what fraction of these are being responded to, by the IFF transponder 200. This can provide a further indication if the IFF transponder 200 is operating with an incorrect TOD or key, such as when the ratio of valid requests to total requests, or the ratio of corresponding replies to total requests is below a threshold value (such as less than 10%).

When the alert circuit 280 identifies a potentially incorrect TOD or cryptographic key, the alert circuit sends alert signals 290 to notify (such as to alert) an operator of the vessel or craft housing the IFF transponder 200. These alert signals 290, for example, can direct or otherwise cause an electronic speaker to emit an audio signal that is audible to the operator (e.g., an audio alert), or direct or otherwise cause an electronic display or other lit or visually activated device to emit a visible signal that can be seen by the operator (e.g., a visual alert), or direct or otherwise cause a vibrational device to emit a tactile signal that can be felt by the operator (e.g., a tactile alert). In some embodiments, the operator decides which type of alert (e.g., audio, visual, or tactile) to provide in response to the alert signals 290.

Figure 3:
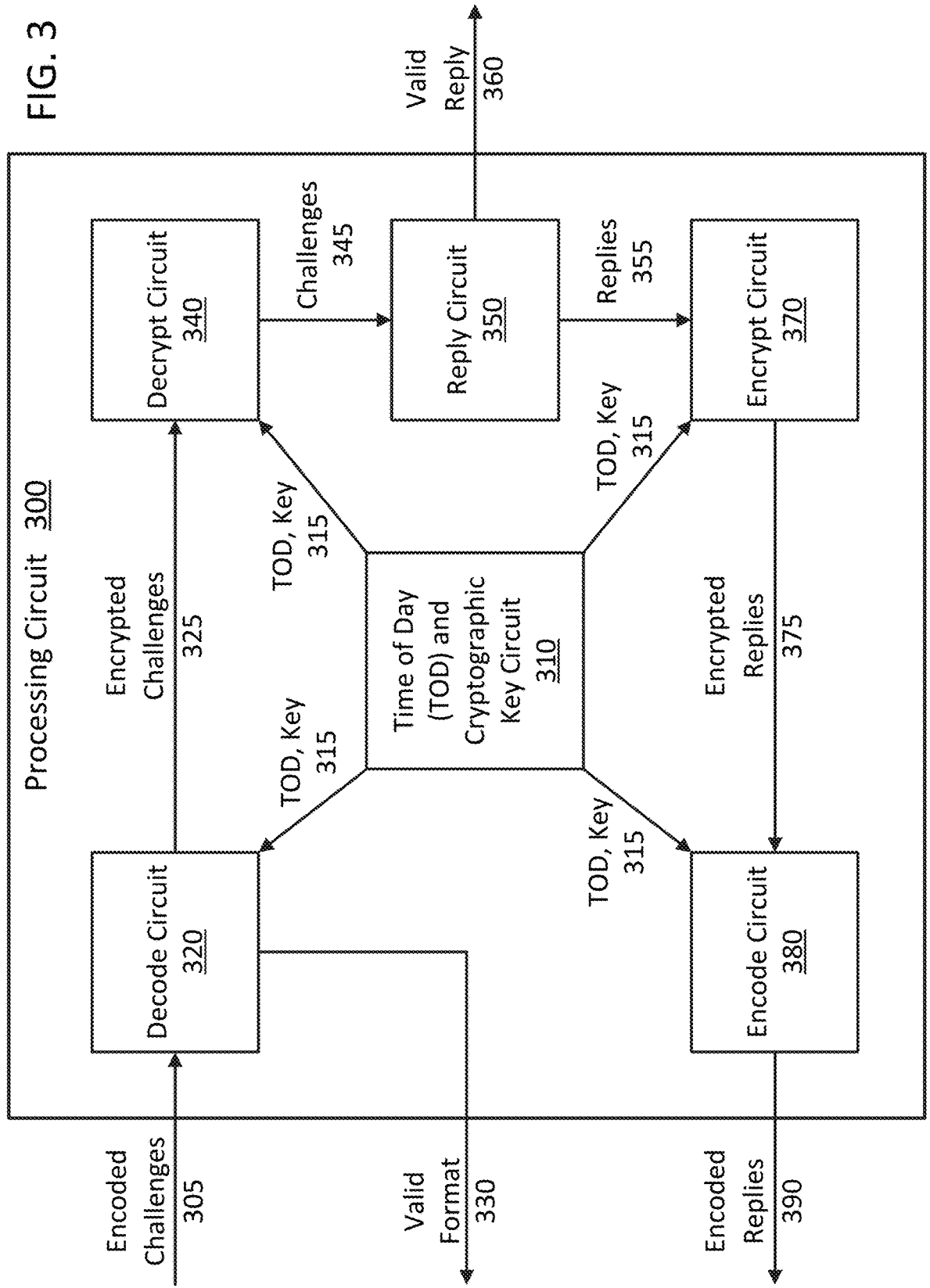
FIG. 3 is a block diagram of an example processing circuit, such as for the IFF transponder of FIG. 2, according to an embodiment of the present disclosure.

FIG. 3 is a block diagram of an example processing circuit 300, such as for the IFF transponder 200 of FIG. 2, according to an embodiment of the present disclosure. The processing circuit 300 includes a decode circuit 320, a TOD and cryptographic key circuit 310, a decrypt circuit 340, a reply circuit 350, an encrypt circuit 370, and an encode circuit 380. The processing circuit 300, and in particular the decode circuit 320, receives pulse patterns having encoded encrypted IFF challenges 305 as input, decodes the received challenges 305 into encrypted challenges 325 using TOD and/or cryptographic key 315 (as generated or maintained by the TOD and cryptographic key circuit 310. In the process, the decode circuit 320 outputs a valid format 330 indicator of whether the decoding was successful (e.g., the encoded challenges 305 fit the pattern of a valid encrypted interrogator challenge in light of the TOD and key 315). The decrypt circuit 340 decrypts the decoded challenges 325 using the TOD and/or cryptographic key 315, and outputs the decrypted challenges 345.

In further detail, in some embodiments, the processing circuit 300 or one or more of its components are field-programmable gate arrays (FPGA) or microprocessors configured to decode and decrypt the encoded challenges 305 into the decrypted challenges 345 and valid format 330 indicator using the TOD and cryptographic key 315. In one embodiment, the TOD and cryptographic key 315 are maintained by a TOD and cryptographic key circuit 310, which is responsible for updating and synchronizing the TOD and/or cryptographic key 315 to the same time and/or value used in other components in the IFF system, such as the IFF interrogators. The TOD and/or cryptographic key 315 are input to and used by the other components of the processing circuit 300 to carry out their tasks. For example, in one embodiment, the TOD and cryptographic key circuit 310 uses the TOD to generate (e.g., select) the corresponding cryptographic key, which can change frequently (such as every day, or twice a day, to name a few possibilities).

In some embodiments, one or both of the generated TOD and the cryptographic key 315 are used by the decode circuit 320 to decode the encoded challenges 305 into the encrypted challenges 325 and to set the valid format 330 indicator appropriately. As illustrated in the example waveform in FIG. 4, the pulse patterns of the encoded challenges 305 include the encrypted challenges 325, only they are encoded in a variable pattern (depending on the TOD and/or the key 315) of shaped pulses and modulated signals (e.g., MSK modulated bits). Knowing the pattern of pulses (such as preamble pulses, from the TOD and/or the key 315), the decode circuit 320 identifies and demodulates the analog encoded data pulses of the next encrypted challenge 325 into a set of encrypted digital bits forming the encrypted challenge 325. If an expected pattern is encountered (e.g., preamble and data pulses in the proper format for the given TOD and key 315), the decode circuit 320 also outputs the valid format 330 indicator to let the rest of the IFF transponder know that an IFF interrogation request was successfully decoded.

After decoding, in some embodiments, the decrypt circuit 340 takes the next encrypted challenge 325, together with the TOD and/or the cryptographic key 315, and decrypts the decoded challenge 325 into the next decrypted challenge 345 (or the next challenge). For example, in one embodiment, encryption and decryption, as directed by the TOD and cryptographic key 315, is performed consistently by the IFF interrogators and transponders. Here, the TOD and the cryptographic key 315 are used to maintain secure communications and prevent eavesdroppers from being able to intercept and interpret friendly communications, or to insert hostile communications. By controlling the crucial encryption, decryption, encoding, and decoding steps through the processing circuit 300, security in the IFF system can be maintained by securing the processing circuit 300.

The processing circuit 300 further includes the reply circuit 350, which receives the challenges 345 and generates or otherwise prepares proper replies 355 to the challenges. In addition, the reply circuit 350 outputs a valid reply 360 indicator to let other components in the IFF transponder know that a successful reply 355 was generated. The encrypt circuit 370 receives the generated replies 355 and encrypts the replies to output encrypted replies 375 using the TOD and or the cryptographic key 315. The encode circuit 380 encodes (e.g., modulates, such as with MSK modulation) the encrypted replies 375 using the TOD and/or the cryptographic key 315, and outputs the encoded replies 390 for use by a transmitter (such as transmitter 260) to send back to the IFF interrogator.

Figure 4:
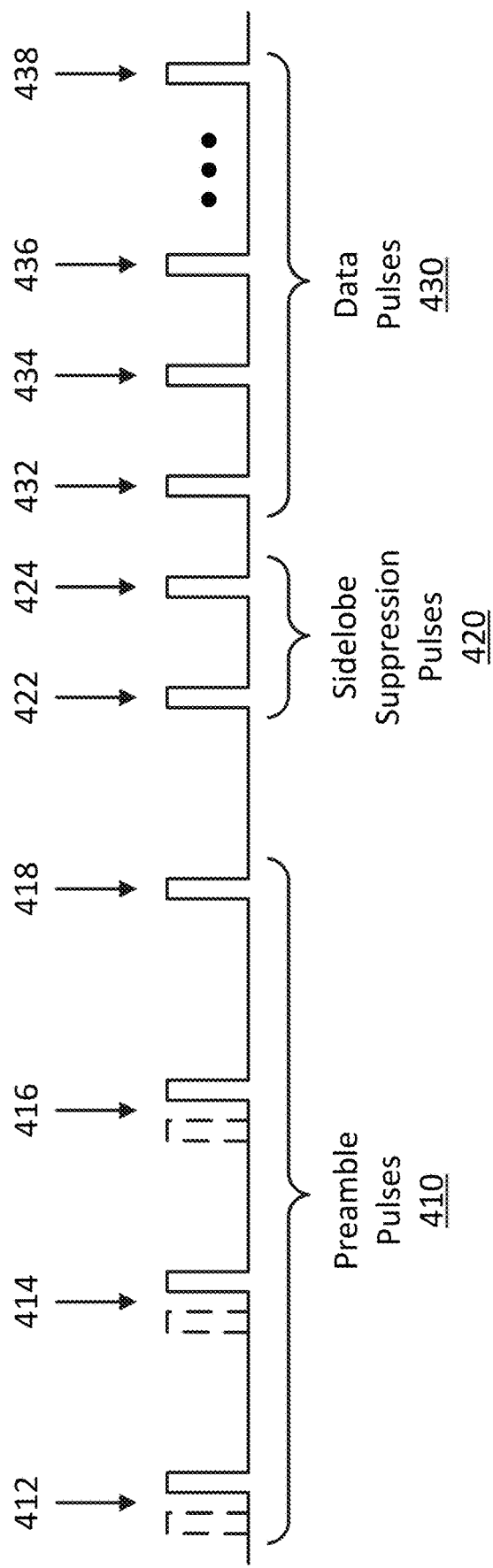
FIG. 4 is a waveform diagram of an example IFF interrogation request (or challenge) for responding by an IFF transponder, such as the IFF transponder of FIG. 2, according to an embodiment of the present disclosure.

FIG. 4 is a waveform diagram of an example IFF interrogation request 400 (or challenge) for responding by an IFF transponder, such as the IFF transponder of FIG. 2, according to an embodiment of the present disclosure. The challenge 400 includes three main portions, each composed of multiple transmission pulses of electromagnetic radiation, such as a modulated carrier wave of 1030 MHz. The three portions include preamble pulses 410, sidelobe suppression pulses 420, and data pulses 430.

In further detail, for the interrogation waveform 400 of FIG. 4, there are four preamble pulses 410 (and numbered 412, 414, 416, and 418) indicating the start of an IFF interrogation request. The spacing pattern of the preamble pulses 410 varies with the TOD and/or cryptographic key. The preamble pulses 410 are pulses of electromagnetic energy, each formed in a particular shape by their duration and magnitude of signal (e.g., at 1030 MHz carrier wave for a fixed intensity and amount of time). The primary information communicated by the preamble pulses 410 is their spacing, which varies with the TOD and/or cryptographic key, as illustrated in the FIG. 4.

The fourth preamble pulse 418 is shown as fixed for illustration, the first preamble pulse 412, the second preamble pulse 414, and the third preamble pulse 416 varying with the TOD and/or cryptographic key relative to the fourth preamble pulse 418. In addition, there are two sidelobe suppression pulses 420 (and numbered 422 and 424), at predictable locations from the fourth preamble pulse 418. Unlike the preamble pulses 410, the sidelobe suppression pulses 420 are not to be received as part of a legitimate or valid interrogation request. This is because the interrogation request is intended to be a directional transmission aimed at a particular target craft or vessel from the IFF interrogator. Otherwise, any interrogation request runs the risk of being received by every possible target craft or vessel in range, which could lead to unacceptable levels of unintended responses to such requests from the other crafts and vessels. Accordingly, a main beam is directed at the intended platform (such as with a couple of degrees of azimuthal coverage) and does not include the sidelobe suppression pulses 420. In addition, a much less powerful emission of the sidelobe suppression pulses 420 is broadcast concurrently, such as a from a separate antenna in an omnidirectional pattern.

The signal strength of the main beam of the interrogation waveform 400 is such that the intended platform receives the preamble pulses 410 with a much greater signal strength than the sidelobe suppression pulses 420. On the other hand, unintended platforms (e.g., not in the main beam's path) may only get a much-reduced preamble pulse pattern, such that the following sidelobe suppression pulses 420 are much closer in strength to (if not exceeding) the signal strength of the preamble pulses 410. Accordingly, the unintended platform knows not to respond to such a pattern. It should be noted that sidelobe suppression pulses 422 and 424 may be the same shape and at known spacing relative to the fourth preamble pulse 418, their information coming in the form of their signal strength received by the platform relative to the strength of the preamble pulses 410.

Next in FIG. 4, the data pulses 430 follow the sidelobe suppression pulses 420. There can be many data pulses 430, such as a first data pulse 432, a second data pulse 434, a third data pulse 436, and so on up until a last data pulse 438. In one embodiment, there are 11 data pulses 430. The data pulses 430 can follow a predictable pattern (e.g., from the fourth preamble pulse 418, the first sidelobe suppression pulse 422, or the second sidelobe suppression pulse 424). Unlike the preamble pulses 410 and the sidelobe suppression pulses 420, in some embodiments, the data pulses 430 convey information using encoded or modulated bit streams on the carrier wave, such as MSK encoded data bits. Accordingly, the data pulses 430 have a different content than that of the preamble pulses 410 and the sidelobe suppression pulses 420. Further, decoding the data pulses 430 (e.g., by the processing circuit) can involve demodulating the pulses to recover the digital bits making up the data content of the data pulses 430.

In some embodiments, receiving a proper interrogation waveform 400 includes receiving the four preamble pulses 410 (whose pattern varies with the TOD and/or cryptographic key), both of the sidelobe suppression pulses 420 meet conditions for reply, and receiving and demodulating (or decoding) the 11 data pulses 430, or at least verifying that the received data pulses 430 appear to be encoded or modulated by the appropriate technique (such as MSK). Upon making such a determination, the decode circuit can indicate that a valid interrogation request has been received. The decode circuit can further demodulate and digitize the received data pulses into their corresponding digital bits. The decrypt circuit can then decrypt the received data pulse bit data using the TOD and/or cryptographic key. The resulting decrypted interrogation request can then be passed to a reply circuit to prepare a corresponding reply to the interrogator.

Figure 5:
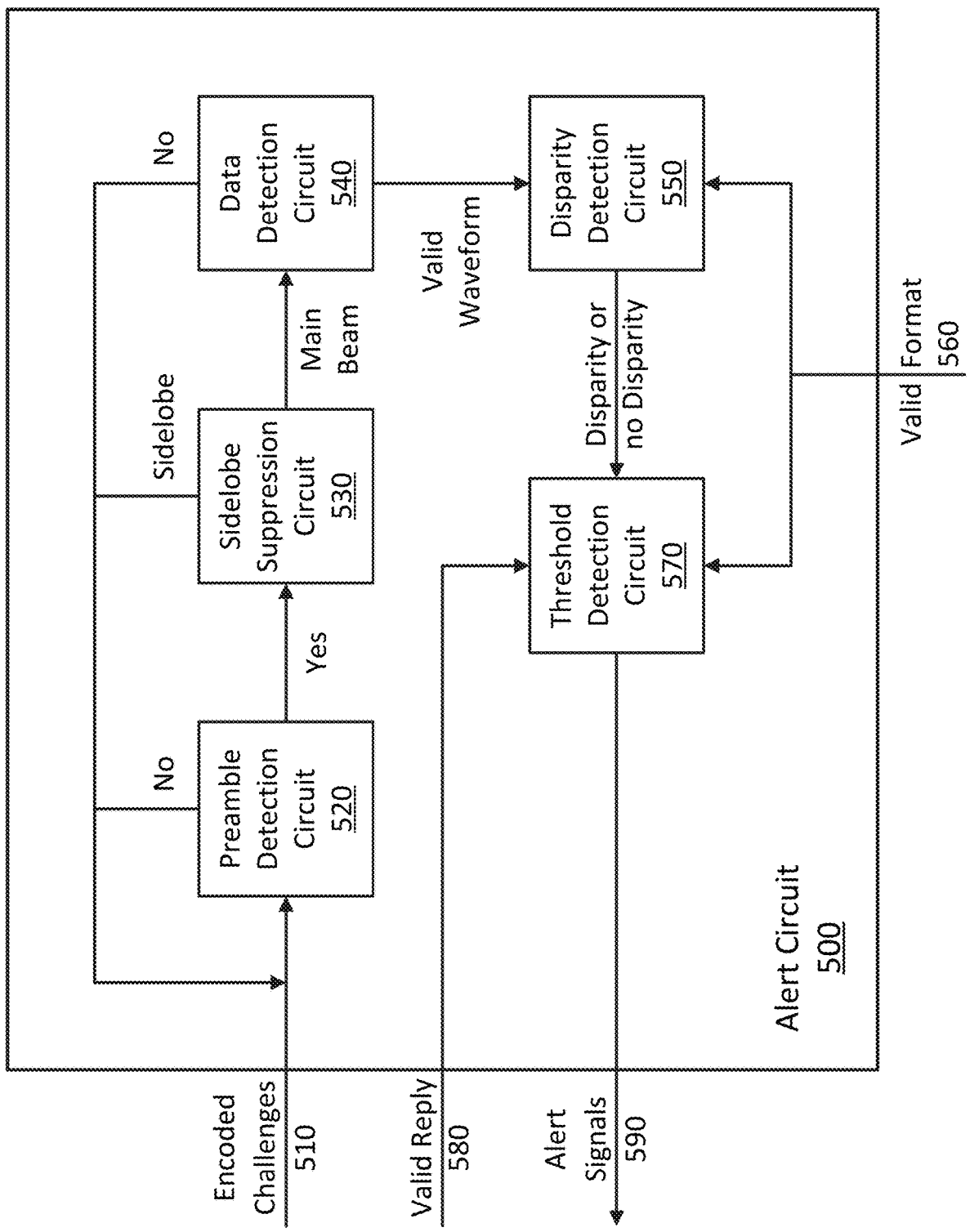
FIG. 5 is a block diagram of example alert circuit, such as for the IFF transponder of FIG. 2, according to an embodiment of the present disclosure.

FIG. 5 is a block diagram of example alert circuit 500, such as for the IFF transponder 200 of FIG. 2, according to an embodiment of the present disclosure. The alert circuit 500 includes a preamble detection circuit 520, a sidelobe suppression circuit 530, a data detection circuit 540, a disparity detection circuit 550, and a threshold detection circuit 570. The alert circuit 500 works without knowledge of the TOD or the cryptographic key. As such, the alert circuit 500 can detect situations that can be overlooked by the remainder of the IFF transponder, should the IFF transponder be operating with an incorrect TOD or wrong cryptographic key. The alert circuit 500 receives pulse patterns including the encoded challenges 510 (e.g., the same as the input to the processing circuit), together with a valid format 560 indicator and a valid reply 580 indicator. The alert circuit 500 determines if any valid interrogation waveforms are part of the encoded challenges 510, and if the valid waveforms have the correct format (as verified by the processing circuit) and are properly replied to (as verified by the processing circuit). If there are significant deviations between pairs of these numbers (e.g., valid waveforms, valid formats, and valid replies), the alert circuit 500 outputs appropriate alert signals 590 to warn an operator of the vessel or craft housing the IFF transponder.

In further detail, and using the interrogation waveform pattern 400 in FIG. 4 as an example interrogation waveform, the encoded challenges 510 are processed first by the preamble detection circuit 520. The preamble detection circuit 520 examines the encoded challenges 510 for preamble pulses (such as the preamble pulses 410 of FIG. 4). While the preamble detection circuit 520 is unaware of the precise pattern of the preamble pulses 410, it can be configured to detect the presence of the four such preamble pulses 410 from their waveform shape and frequency. Further, the preamble detection circuit 520 can be configured to identify if the stagger pattern observed in the four received preamble pulses 410 is one that is possible (e.g., within the tolerance of minimum and maximum spacing between preamble pulses 410).

If at any point the preamble detection circuit 520 detects that it is impossible to receive the four preamble pulses 410 in the possible window (after receiving the first preamble pulse) and pulse spacing, the preamble detection circuit 520 resets and takes the No path in FIG. 5 to continue looking for a valid preamble pattern in the remaining encoded challenges 510. Otherwise, the preamble detection circuit 520 takes the Yes path in FIG. 5 identifies the end of the preamble pulses 410 and passes control to the sidelobe suppression circuit 530.

From the last received preamble pulse, the sidelobe suppression circuit 530 is configured to examine the encoded challenges 510 and detect if either of the sidelobe suppression pulses 420 appears and, if so, is their signal strength sufficiently smaller than the received preamble pulses 410. If no sidelobe suppression pulses 420 are received in the encoded challenges 510, or if any received sidelobe suppression pulses are sufficiently weaker than the received preamble pulses 410, control follows the Main Beam path in FIG. 5 to the data detection circuit 540. Otherwise, if either of the sidelobe suppression pulses is detected and with sufficiently strong signal strength, control passes to the Sidelobe path in FIG. 5 and back to the preamble detection circuit 520.

Continuing with the alert circuit 500 of FIG. 5, the data detection circuit 540 is configured to detect if the 11 data pulses 430 are received in the encoded challenges 510, and if their spacing is compatible with the general interrogation waveform 400. Here, the data pulses 430 resemble modulated data (such as MSK encoded data bits), and the data detection circuit 540 can be configured to look for those type of pulses. In some other embodiments, different interrogation waveforms can be defined, and corresponding different patterns can be searched for in the encoded challenges 510. If 11 such data pulses 430 are detected, then the alert circuit has received what appears to be a valid interrogation waveform and follows the Valid Waveform path in FIG. 5 to the disparity detection circuit 550. Otherwise, the No path is taken, and control returns to the preamble detection to look for the start of another possible interrogation waveform in the next portions of the encoded challenges 510.

The disparity detection circuit 550 is configured to increment a count of the valid interrogation waveforms encountered in the encoded challenges 510. In addition, the disparity detection circuit 550 looks for a disparity, which is when what appears to be a valid waveform is received by the IFF transponder, but the processing circuit is not able to decode it. A disparity is detected and counted in the disparity detection circuit 550 when a seemingly valid waveform is uncovered in the encoded challenges 510, but the valid format 560 indicator from the processing circuit does not indicate the successful decoding of an interrogation request by the processing circuit. However, if the valid format 560 indicator indicates that a successful decoding of the interrogation request took place in the processing circuit, then no disparity is detected in the disparity detection circuit 550, and control passes to the threshold detection circuit 570 for further testing.

The threshold detection circuit 570 is configured to detect if the processing circuit indicated, using the valid reply 580 indicator, if a valid response was prepared to a successfully decrypted interrogation request. This is an additional test to the disparity detection, since it is possible that a valid interrogation waveform was detected in the encoded challenges 510, and that the processing circuit was able to successfully decode such an interrogation waveform, but when the corresponding decrypted data was presented to the processing circuit, it was not a valid interrogation request (perhaps it was not even valid or meaningful data). When this happens, the threshold detection circuit 570 is configured to count such an invalid request, and not increment the successful reply count.

At this point, the threshold detection circuit 570 has several counts, including the number of successfully detected interrogation waveforms (valid waveforms) from the alert circuit 500, the number of successfully decoded interrogation requests (valid formats) from the processing (decode) circuit, and the number of successful replies generated (valid replies) from the processing (reply) circuit. By taking ratios of any two of these counts, different rates of IFF transponder processing can be determined, such as the rate of successful decoding of an interrogation waveform versus the detecting of the interrogation waveform, or the rate of successful replying to an interrogation waveform versus the detecting of the interrogation waveform. In addition, threshold values can be determined and/or provided (such as programmed) to the threshold detection circuit 570, to indicate an insufficient number of replies (e.g., less than 10%) are being generated, or an insufficient number of apparent interrogation requests are being successfully decoded (e.g., less than 15%), both of which can indicate the alert circuit is working with an incorrect TOD or a wrong cryptographic key.

Once the threshold tests fail, the alert circuit 500 can take steps to alert the operator (such as the pilot) of the craft or vessel housing the IFF transponder, through the alert signals 590. For instance, the threshold detection circuit 570 can be configured to direct or otherwise cause an electronic speaker to emit an audio signal that is audible to the operator when the minimum decoding or replying rates are not met. In some other embodiments, a visible signal or tactile signal is controlled by the alert signals 590 to alert the operator. In some embodiments, the operator indicates a preference for which type of alert they would like to receive if it appears the IFF transponder is working with an incorrect TOD or a wrong cryptographic key. In case of remotely piloted or remote operated crafts or vessels, such as a drone or other unmanned aerial system (UAS), the alert signals 590 can be directed to or delivered to the remote pilot or remote operator. For example, these alert signals 590 can include or cause a visual, aural, or tactile alert to be delivered to or take place at the remote-control interface of the unmanned craft or vessel. Accordingly, a remote pilot or operator can be notified or alerted from the alert circuit 500 detecting an incorrect TOD or wrong cryptographic key in a similar manner to a pilot or operator on board the platform receiving such a notification or alert.

Methodology

Figure 6A:
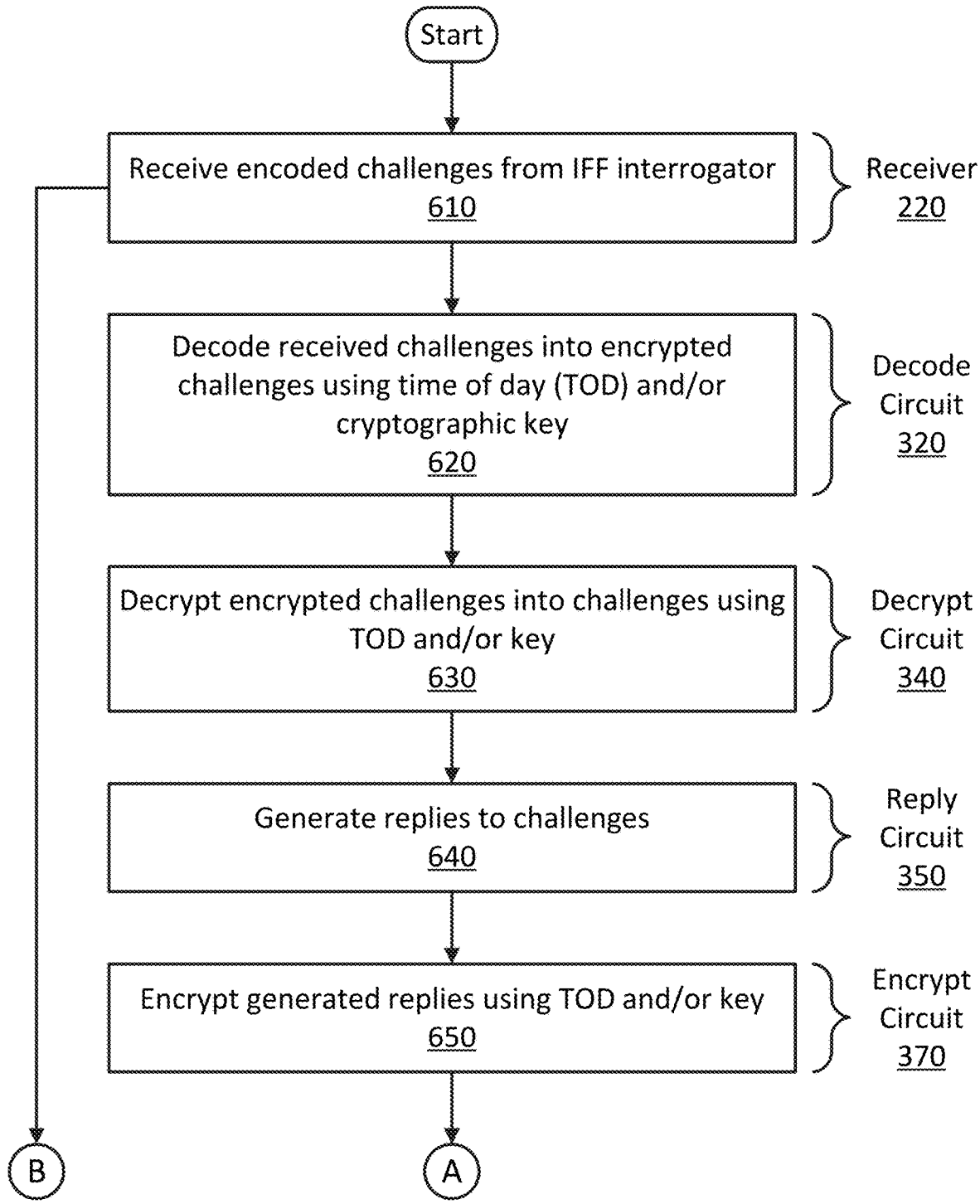

FIGS. 6A-6B are a flow diagram of an example method 600 of IFF transponder processing, such as by the IFF transponder 200 of FIG. 2, according to an embodiment of the present disclosure. More generally, the method 600 and other methods described herein may be implemented in hardware or combinations of hardware and software. For example, the method 600 may be implemented by the components or techniques of FIGS. 1-5. In another embodiment, the method 600 may be implemented by one or more custom circuits such as FPGAs in combination with an electronic receiver and transmitter, all configured to carry out the method 600. In other embodiments, the method 600 may be performed in conjunction with a special purpose processor, such as a signal processor.

In some other embodiments, some or much of the method 600 may be implemented as a series of computer instructions, such as software, firmware, or a combination of the two, together with one or more computer processors (e.g., one or more microprocessors). The instructions, when executed on a given processor, cause portions of the method 600 to be performed. For example, in one or more embodiments, a computer program product is provided. The computer program product includes one or more non-transitory machine-readable mediums (such as a compact disc, a DVD, a solid-state drive, a hard drive, RAM, ROM, on-chip processor cache, or the like) encoded with instructions that when executed by one or more processors cause portions of the method 600 (or other method described herein) to be carried out for IFF transponder processing. In addition, while the methods described herein may appear to have a certain order to their operations, other embodiments may not be so limited. Accordingly, the order of the operations can be varied between embodiments, as would be apparent in light of this disclosure.

In the method 600 of IFF transponder processing of FIGS. 6A-6B, processing begins with receiving 610, by an electronic receiver (such as receiver 220) of an IFF transponder (such as IFF transponder 200), electromagnetic radiation (such as interrogating signals 210, e.g., 1030 MHz modulated signals) including pulse patterns having encoded encrypted IFF challenges (such as encoded challenges 230, 305, or 510 taking on, for example, interrogation waveform 400) from an IFF interrogator (such as IFF interrogator 110). The method 600 further includes decoding 620, by a decode circuit (such as decode circuit 320) of the IFF transponder, the received encoded encrypted challenges into the encrypted challenges (such as encrypted challenges 325) using a time of day (TOD) and/or a cryptographic key (such as TOD and/or cryptographic key 315). The method 600 further includes decrypting 630, by a decrypt circuit (such as decrypt circuit 340) of the IFF transponder, the encrypted challenges into (decrypted) challenges (such as challenges 345) using the TOD and/or the cryptographic key, and generating 640, by a reply circuit (such as reply circuit 350) of the IFF transponder, replies (such as replies 355) to the challenges. The method 600 further include encrypting 650, by an encrypt circuit (such as encrypt circuit 370) of the IFF transponder, the generated replies into encrypted replies (such as encrypted replies 375) using the TOD and/or the cryptographic key, and encoding 655, by an encode circuit (such as encode circuit 380) of the IFF transponder, the encrypted replies into encoded replies (such as encoded replies 250).

The method 600 further includes transmitting 660, by an electronic transmitter (such as transmitter 260) of the IFF transponder, the encoded replies to the IFF interrogator. Concurrent with this IFF transponder processing, the method 600 further includes: detecting 670, by an alert circuit (such as alert circuit 280 or 500) of the IFF transponder, the encrypted challenges from the received encoded challenges without using the TOD or the key; using 680 by the alert circuit, the detected challenges to determine if the TOD is incorrect and/or the cryptographic key is wrong; and issuing 690, by the alert circuit, an alert (such as alert signals 290 or 590) in response to determining the TOD is incorrect and/or the cryptographic key is wrong. In some embodiments, the IFF transponder processing includes Mode 5 processing and the encoded encrypted challenges include Mode 5 challenges. In some embodiments, the alert circuit alerts the operator by directing or otherwise causing a visual alert to display on one of the multi-function displays available to the operator. In some other embodiments, issuing the alert includes directing an electronic speaker to emit an audio signal that is audible to the operator.

In some embodiments, determining if the TOD is incorrect and/or the key is wrong includes counting the detected challenges, counting the encrypted challenges decoded by the decode circuit, counting the generated replies, and using the counts of the detected challenges, the decoded challenges, and the generated replies to determine if the TOD is incorrect and/or the key is wrong. In some such embodiments, detecting the encrypted challenges includes identifying preamble portions (such as preamble pulses 410) of the encoded challenges without using the TOD or the key, identifying corresponding data portions (such as data pulses 430) of the encoded challenges following the identified preamble portions without using the TOD or the key, and detecting the encrypted challenges as those identified preamble portions having the corresponding identified data portions.

In one such example embodiment, using the counts of the detected challenges, the decoded challenges, and the generated replies includes creating one or more ratios of corresponding pairs of the counts of the detected challenges, the decoded challenges, and the generated replies; and comparing the one or more ratios to corresponding alert levels of a threshold detector, to determine if the TOD is incorrect and/or the key is wrong. Numerous other methods and techniques will be apparent in light of the present disclosure.

Further Example Embodiments

The following examples pertain to further embodiments, from which numerous permutations and configurations will be apparent.

Example 1 is an identification friend or foe (IFF) transponder including: an electronic receiver to receive encoded challenges from an IFF interrogator; a processing circuit including a decode circuit to decode the received challenges into encrypted challenges using a time of day (TOD) and/or a cryptographic key, a decrypt circuit to decrypt the encrypted challenges into challenges using the TOD and/or the key, a reply circuit to generate replies to the challenges, and, an encode circuit to encode the generated replies using the TOD and/or the key; an electronic transmitter to transmit the encoded replies to the IFF interrogator; and, an alert circuit to detect the encrypted challenges from the received challenges without using the TOD or the key, use the detected challenges to determine if the TOD is incorrect and/or the key is wrong, and issue an alert in response to determining the TOD is incorrect and/or the key is wrong.

Example 2 includes the IFF transponder of Example 1, wherein the IFF transponder includes a Mode 5 transponder and the encoded challenges include Mode 5 challenges.

Example 3 includes the IFF transponder of Example 1, wherein the alert circuit issues the alert by causing a display device to display a visual alert. In another such example, the alert circuit issues the alert by causing an electronic speaker to emit an audible signal.

Example 4 includes the IFF transponder of Example 1, wherein the alert circuit determines if the TOD is incorrect and/or the key is wrong by: counting the detected challenges; counting the encrypted challenges decoded by the decode circuit, or counting the generated replies, or counting both the decoded challenges and the generated replies; and, using the counts of the detected challenges and one or both of the decoded challenges and the generated replies to determine if the TOD is incorrect and/or the key is wrong.

Example 5 includes the IFF transponder of Example 4, wherein the alert circuit uses the counts of the detected challenges and the one or both of the decoded challenges and the generated replies by: creating one or more ratios of corresponding pairs of the counts of the detected challenges, the decoded challenges, and the generated replies; and, comparing the one or more ratios to corresponding alert levels of a threshold detector, to determine if the TOD is incorrect and/or the key is wrong.

Example 6 includes the IFF transponder of Example 1, wherein the alert circuit detects the encrypted challenges by: identifying preamble portions of the encoded challenges without using the TOD or the key; identifying corresponding data portions of the encoded challenges following the identified preamble portions without using the TOD or the key; and, detecting the encrypted challenges as those identified preamble portions having the corresponding identified data portions.

Example 7 is an identification friend or foe (IFF) system including the IFF transponder of Example 1 and the IFF interrogator.

Example 8 is a method of identification friend or foe (IFF) transponder processing, the method including: receiving, by an electronic receiver of an IFF transponder, encoded challenges from an IFF interrogator; decoding, by a decode circuit of the IFF transponder, the received challenges into encrypted challenges using a time of day (TOD) and/or a cryptographic key; decrypting, by a decrypt circuit of the IFF transponder, the encrypted challenges into challenges using the TOD and/or the key; generating, by a reply circuit of the IFF transponder, replies to the challenges; encoding, by an encode circuit of the IFF transponder, the generated replies using the TOD and/or the key; transmitting, by an electronic transmitter of the IFF transponder, the encoded replies to the IFF interrogator; detecting, by an alert circuit of the IFF transponder, the encrypted challenges from the received challenges without using the TOD or the key; using, by the alert circuit, the detected challenges to determine if the TOD is incorrect and/or the key is wrong; and, issuing, by the alert circuit, an alert in response to determining the TOD is incorrect and/or the key is wrong.

Example 9 includes the method of Example 8, wherein the IFF transponder includes a Mode 5 transponder and the encoded challenges include Mode 5 challenges.

Example 10 includes the method of Example 8, wherein issuing the alert includes causing an electronic speaker to emit an audible signal.

Example 11 includes the method of Example 8, wherein determining if the TOD is incorrect and/or the key is wrong includes: counting the detected challenges; counting the encrypted challenges decoded by the decode circuit, or counting the generated replies, or counting both the decoded challenges and the generated replies; and, using the counts of the detected challenges and one or both of the decoded challenges and the generated replies to determine if the TOD is incorrect and/or the key is wrong.

Example 12 includes the method of Example 11, wherein using the counts of the detected challenges and the one or both of the decoded challenges and the generated replies includes: creating one or more ratios of corresponding pairs of the counts of the detected challenges, the decoded challenges, and the generated replies; and, comparing the one or more ratios to corresponding alert levels of a threshold detector, to determine if the TOD is incorrect and/or the key is wrong.

Example 13 includes the method of Example 8, wherein detecting the encrypted challenges includes: identifying preamble portions of the encoded challenges without using the TOD or the key; identifying corresponding data portions of the encoded challenges following the identified preamble portions without using the TOD or the key; and, detecting the encrypted challenges as those identified preamble portions having the corresponding identified data portions.

Example 14 is a computer program product including one or more non-transitory machine-readable storage mediums having instructions encoded thereon for performing the IFF transponder processing by the method of Example 8 using the decode circuit, the decrypt circuit, the reply circuit, the encode circuit, and the alert circuit in combination with the electronic receiver and the electronic transmitter.

Example 15 is a system for identification friend or foe (IFF) transponder processing, the system including: the computer program product of Example 14; the decode circuit, the decrypt circuit, the reply circuit, the encode circuit, and the alert circuit to execute the encoded instructions; the electronic receiver; and, the electronic transmitter.

Example 16 is an alert circuit for an identification friend or foe (IFF) transponder, the IFF transponder including an electronic receiver to receive encoded challenges from an IFF interrogator, a decode circuit to decode the received challenges into encrypted challenges using a time of day (TOD) and/or a cryptographic key, and a decrypt circuit to decrypt the encrypted challenges into challenges using the TOD and/or the key, the alert circuit including: logic to detect the encrypted challenges from the received challenges without using the TOD or the key; logic to use the detected challenges to determine if the TOD is incorrect and/or the key is wrong; and, logic to issue an alert in response to determining the TOD is incorrect and/or the key is wrong.

Example 17 includes the alert circuit of Example 16, wherein the IFF transponder includes a Mode 5 transponder and the encoded challenges include Mode 5 challenges.

Example 18 includes the alert circuit of Example 16, wherein the logic to issue the alert includes logic to cause an electronic speaker to emit an audible signal.

Example 19 includes the alert circuit of Example 16, wherein the logic to determine if the TOD is incorrect and/or the key is wrong includes: logic to count the detected challenges; logic to count the encrypted challenges decoded by the decode circuit, or to count replies to the challenges generated by a reply circuit of the IFF transponder, or to count both the decoded challenges and the generated replies; and, logic to use the counts of the detected challenges and one or both of the decoded challenges and the generated replies to determine if the TOD is incorrect and/or the key is wrong.

Example 20 includes the alert circuit of Example 19, wherein the logic to use the counts of the detected challenges and the one or both of the decoded challenges and the generated replies includes: logic to create one or more ratios of corresponding pairs of the counts of the detected challenges, the decoded challenges, and the generated replies; and, logic to compare the one or more ratios to corresponding alert levels of a threshold detector, to determine if the TOD is incorrect and/or the key is wrong.

Example 21 includes the alert circuit of Example 16, wherein the logic to detect the encrypted challenges includes: logic to identify preamble portions of the encoded challenges without using the TOD or the key; logic to identify corresponding data portions of the encoded challenges following the identified preamble portions without using the TOD or the key; and, logic to detect the encrypted challenges as those identified preamble portions having the corresponding identified data portions.

Example 22 is an identification friend or foe (IFF) transponder including: the alert circuit of Example 16; the electronic receiver; the decode circuit; the decrypt circuit; a reply circuit to generate replies to the challenges; an encode circuit to encode the replies using the TOD and/or the key; and, an electronic transmitter to transmit the encoded replies to the IFF interrogator.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An identification friend or foe (IFF) transponder comprising:
    an electronic receiver to receive encoded challenges from an IFF interrogator;
    a processing circuit including
        a decode circuit to decode the received challenges into encrypted challenges using a time of day (TOD) and/or a cryptographic key,
        a decrypt circuit to decrypt the encrypted challenges into challenges using the TOD and/or the key,
        a reply circuit to generate replies to the challenges, and
        an encode circuit to encode the generated replies using the TOD and/or the key;
    an electronic transmitter to transmit the encoded replies to the IFF interrogator; and
    an alert circuit to detect the encrypted challenges from the received challenges without using the TOD or the key, use the detected challenges to determine if the TOD is incorrect and/or the key is wrong, and issue an alert in response to determining the TOD is incorrect and/or the key is wrong.

2. The IFF transponder of claim 1, wherein the IFF transponder comprises a Mode 5 transponder and the encoded challenges comprise Mode 5 challenges.

3. The IFF transponder of claim 1, wherein the alert circuit issues the alert by causing a display device to display a visual alert.

4. The IFF transponder of claim 1, wherein the alert circuit determines if the TOD is incorrect and/or the key is wrong by:
    counting the detected challenges;
    counting the encrypted challenges decoded by the decode circuit, or counting the generated replies, or counting both the decoded challenges and the generated replies; and
    using the counts of the detected challenges and one or both of the decoded challenges and the generated replies to determine if the TOD is incorrect and/or the key is wrong.

5. The IFF transponder of claim 4, wherein the alert circuit uses the counts of the detected challenges and the one or both of the decoded challenges and the generated replies by:
    creating one or more ratios of corresponding pairs of the counts of the detected challenges, the decoded challenges, and the generated replies; and
    comparing the one or more ratios to corresponding alert levels of a threshold detector, to determine if the TOD is incorrect and/or the key is wrong.

6. The IFF transponder of claim 1, wherein the alert circuit detects the encrypted challenges by:
    identifying preamble portions of the encoded challenges without using the TOD or the key;
    identifying corresponding data portions of the encoded challenges following the identified preamble portions without using the TOD or the key; and
    detecting the encrypted challenges as those identified preamble portions having the corresponding identified data portions.

7. An identification friend or foe (IFF) system comprising the IFF transponder of claim 1 and the IFF interrogator.

8. A method of identification friend or foe (IFF) transponder processing, the method comprising:

receiving, by an electronic receiver of an IFF transponder, encoded challenges from an IFF interrogator;

decoding, by a decode circuit of the IFF transponder, the received challenges into encrypted challenges using a time of day (TOD) and/or a cryptographic key;

decrypting, by a decrypt circuit of the IFF transponder, the encrypted challenges into challenges using the TOD and/or the key;

generating, by a reply circuit of the IFF transponder, replies to the challenges;

encoding, by an encode circuit of the IFF transponder, the generated replies using the TOD and/or the key;

transmitting, by an electronic transmitter of the IFF transponder, the encoded replies to the IFF interrogator;

detecting, by an alert circuit of the IFF transponder, the encrypted challenges from the received challenges without using the TOD or the key;

using, by the alert circuit, the detected challenges to determine if the TOD is incorrect and/or the key is wrong; and issuing, by the alert circuit, an alert in response to determining the TOD is incorrect and/or the key is wrong.

9. The method of claim 8, wherein the IFF transponder comprises a Mode 5 transponder and the encoded challenges comprise Mode 5 challenges.

10. The method of claim 8, wherein determining if the TOD is incorrect and/or the key is wrong comprises:
counting the detected challenges;
counting the encrypted challenges decoded by the decode circuit, or counting the generated replies, or counting both the decoded challenges and the generated replies; and
using the counts of the detected challenges and one or both of the decoded challenges and the generated replies to determine if the TOD is incorrect and/or the key is wrong.

11. The method of claim 10, wherein using the counts of the detected challenges and the one or both of the decoded challenges and the generated replies comprises:
creating one or more ratios of corresponding pairs of the counts of the detected challenges, the decoded challenges, and the generated replies; and
comparing the one or more ratios to corresponding alert levels of a threshold detector, to determine if the TOD is incorrect and/or the key is wrong.

12. The method of claim 8, wherein detecting the encrypted challenges comprises:
identifying preamble portions of the encoded challenges without using the TOD or the key;
identifying corresponding data portions of the encoded challenges following the identified preamble portions without using the TOD or the key; and
detecting the encrypted challenges as those identified preamble portions having the corresponding identified data portions.

13. A computer program product including one or more non-transitory machine-readable storage mediums having instructions encoded thereon for performing the IFF transponder processing by the method of claim 8 using the decode circuit, the decrypt circuit, the reply circuit, the encode circuit, and the alert circuit in combination with the electronic receiver and the electronic transmitter.

14. A system for identification friend or foe (IFF) transponder processing, the system comprising:
the computer program product of claim 13;
the decode circuit, the decrypt circuit, the reply circuit, the encode circuit, and the alert circuit to execute the encoded instructions;
the electronic receiver; and
the electronic transmitter.

15. An alert circuit for an identification friend or foe (IFF) transponder, the IFF transponder including an electronic receiver to receive encoded challenges from an IFF interrogator, a decode circuit to decode the received challenges into encrypted challenges using a time of day (TOD) and/or a cryptographic key, and a decrypt circuit to decrypt the encrypted challenges into challenges using the TOD and/or the key, the alert circuit comprising:
logic to detect the encrypted challenges from the received challenges without using the TOD or the key;
logic to use the detected challenges to determine if the TOD is incorrect and/or the key is wrong; and
logic to issue an alert in response to determining the TOD is incorrect and/or the key is wrong.

16. The alert circuit of claim 15, wherein the IFF transponder comprises a Mode 5 transponder and the encoded challenges comprise Mode 5 challenges.

17. The alert circuit of claim 15, wherein the logic to determine if the TOD is incorrect and/or the key is wrong comprises:
logic to count the detected challenges;
logic to count the encrypted challenges decoded by the decode circuit, or to count replies to the challenges generated by a reply circuit of the IFF transponder, or to count both the decoded challenges and the generated replies; and
logic to use the counts of the detected challenges and one or both of the decoded challenges and the generated replies to determine if the TOD is incorrect and/or the key is wrong.

18. The alert circuit of claim 17, wherein the logic to use the counts of the detected challenges and the one or both of the decoded challenges and the generated replies comprises:
logic to create one or more ratios of corresponding pairs of the counts of the detected challenges, the decoded challenges, and the generated replies; and
logic to compare the one or more ratios to corresponding alert levels of a threshold detector, to determine if the TOD is incorrect and/or the key is wrong.

19. The alert circuit of claim 15, wherein the logic to detect the encrypted challenges comprises:
logic to identify preamble portions of the encoded challenges without using the TOD or the key;
logic to identify corresponding data portions of the encoded challenges following the identified preamble portions without using the TOD or the key; and
logic to detect the encrypted challenges as those identified preamble portions having the corresponding identified data portions.

20. An identification friend or foe (IFF) transponder comprising:
the alert circuit of claim 15;
the electronic receiver;
the decode circuit;
the decrypt circuit;
a reply circuit to generate replies to the challenges;
an encode circuit to encode the replies using the TOD and/or the key; and
an electronic transmitter to transmit the encoded replies to the IFF interrogator.

* * * * *